United States Patent
Chen et al.

(10) Patent No.: US 7,092,870 B1
(45) Date of Patent: Aug. 15, 2006

(54) SYSTEM AND METHOD FOR MANAGING A TEXTUAL ARCHIVE USING SEMANTIC UNITS

(75) Inventors: Julian C. Chen, White Plains, NY (US); Dimitri Kanevsky, Ossining, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 09/663,812

(22) Filed: Sep. 15, 2000

(51) Int. Cl.
G06F 17/27 (2006.01)
G10L 21/00 (2006.01)
G06K 9/00 (2006.01)
G06K 9/18 (2006.01)

(52) U.S. Cl. .................. 704/9; 704/270; 382/181; 382/186

(58) Field of Classification Search .............. 704/10, 704/7, 9; 715/530; 707/2
See application file for complete search history.

(56) References Cited

U.S. PATENT DOCUMENTS

| | | | | |
|---|---|---|---|---|
| 4,674,066 A | * | 6/1987 | Kucera ........................ | 707/5 |
| 5,268,840 A | * | 12/1993 | Chang et al. ................ | 704/9 |
| 5,319,745 A | * | 6/1994 | Vinsonneau et al. ........ | 715/515 |
| 5,577,135 A | * | 11/1996 | Grajski et al. .............. | 382/253 |
| 5,778,361 A | * | 7/1998 | Nanjo et al. ................. | 707/5 |
| 5,805,747 A | * | 9/1998 | Bradford ..................... | 382/310 |
| 5,832,478 A | * | 11/1998 | George ........................ | 707/3 |
| 5,857,099 A | * | 1/1999 | Mitchell et al. ............ | 704/235 |
| 5,933,525 A | * | 8/1999 | Makhoul et al. ............ | 382/186 |
| 5,953,451 A | * | 9/1999 | Syeda-Mahmood ......... | 382/187 |
| 5,960,447 A | * | 9/1999 | Holt et al. ................... | 715/500 |
| 5,963,893 A | * | 10/1999 | Halstead et al. ............ | 704/9 |
| 6,374,210 B1 | * | 4/2002 | Chu ............................. | 704/9 |

(Continued)

OTHER PUBLICATIONS

Nguyen, Y., Vines, P., Wilkinson, R., A Comparison of Morpheme and Word Based Document Retrieval for Asian Languages, Database and Expert Systems Applications, 1996. Procedings., Seventh International Conference on., pp. 291-296.*

(Continued)

Primary Examiner—Richemond Dorvil
Assistant Examiner—Brian Albertalli
(74) Attorney, Agent, or Firm—F. Chau & Associates LLC; Frank V. DeRosa

(57) ABSTRACT

A system and method for indexing and searching textual archives using semantic units such as syllables and morphemes. In one aspect, a system for indexing a textual archive comprises an AHR (automatic handwriting recognition) system and/or OCR (optical character recognition) system for transcribing (decoding) textual input data (handwritten or typed text) into a string of semantic units (e.g., syllables or morphemes) using a statistical language model and vocabulary based on semantic units (such as syllables or morphemes). The string of semantic units that result from a decoding process are stored in a semantic unit database and indexed with pointers to the corresponding textual data in the textual archive. In another aspect, a system for searching a textual archive is provided, wherein a word (or words) to be searched is rendered into a string of semantic units (e.g., syllables or morphemes) depending on the application. A search engine then compares the string of semantic units (resulting from the input query) against the decoded semantic unit database, and then identifies textual data stored in the textual archive using the indexes that were generated during a semantic unit-based indexing process.

23 Claims, 4 Drawing Sheets

U.S. PATENT DOCUMENTS 6,470,334 B1 * 10/2002 Umemoto ............. 707/3
6,879,951 B1 *  4/2005 Kuo .................... 704/10
2003/0200211 A1 * 10/2003 Tada et al. ............ 707/5

OTHER PUBLICATIONS

Hackett et al., "Comparison of word-based and syllable-based retrieval for Tibetan", Proceedings of the fifth international workshop on on Information retrieval with Asian languages, Nov. 2000, pp. 197-198.*

Hahn, et al., "A study on utilizing OCR technology in building text database", Tenth International Workshop on Database and Expert Systems Applications, Sep. 1-3, 1999, pp. 582-586.*

* cited by examiner

SYSTEM AND METHOD FOR MANAGING A TEXTUAL ARCHIVE USING SEMANTIC UNITS

BACKGROUND

1. Technical Field

The present application relates generally to a system and method for managing textual archives and, more particularly, to a system and method for indexing and searching textual archives using semantic units of words, such as syllables and morphemes.

2. Description of Related Art

There are vast library archives that store manuscripts, manuals, written and typed texts in various languages. Moreover, there are various techniques known to those skilled in the art are employed for indexing textual data stored in such archives, as well as searching for target text. For example, techniques similar to those that are used for automatic indexing of audio data can be applied to automatic indexing of handwriting data in general, wherein a word is used as the basic unit for indexing and searching. Typically, with these conventional audio methods, audio data is transcribed (via automatic speech recognition or manually), time stamped and indexed via words. Similar indexing methods are employed for textual manuscripts, wherein the textual manuscripts are processed by AHR (automatic handwriting recognition) or OCR (optical character recognition) systems to produce electronic text in some format (e.g. ASCII). This decoding process generates an index from electronic textual files into stored textual data that can be used for a search and data retrieval in textual archives.

In general, there are various problems associated with word-based indexing and searching systems. In word-based systems, before searching can be started, a vocabulary and a language model based on known words must be generated. Typically, there are always unknown words (that are not accounted for in the language model and vocabulary), which renders the searching mechanism inefficient as it can only work with known words with a good language model score. Furthermore, a searching mechanism that is based on indexing of letters would be very inaccurate since there is a high level of confusability of what letter the individual written symbols represent in unknown words—indeed, people often write inaccurately and some written symbols resemble different characters.

The disadvantages associated with word-based systems are even more apparent with languages in which the unit "word" in a text is ambiguous (such as Chinese language) or in languages that have very large number of word forms (such as Slavic languages). Indeed, for certain languages such as Chinese and Slavic, traditional word-based methods for indexing data are not readily applicable due to certain features in these languages. For example, for most Asian languages such as Chinese, Japanese, Korean, Thai and Vietnamese, the word boundaries of the character strings do not have "marks" that clearly indicate/define the ends of words such as a blank text (such as the English language and most European languages where the word boundaries are in the printed text or computer text file as "white spaces"). In addition, Slavic languages operate with vocabularies consisting of several million words, which makes it difficult to build a hash table for word-indexing purposes in connection with such enormous vocabularies.

Another disadvantage associated with word-based indexing and searching systems is that certain languages have different fonts and styles for writing characters. These fonts and styles are time dependent. For example, the Chinese characters (ideographs or pictographs, never hieroglyphs) have been developed for about 7000 years. The handwriting styles were fixed at about the 13th century. There are several versions, but for handwriting recognition, there is almost one single style, which is the standard script style (KaiShu). A similar style is the informal script (XingShu), which is more difficult to recognize. The fonts were fixed in the 10th century, after the invention of printing. Such fonts are still used today, and called "Song Style", after the dynasty of Song (900–1200 A.D.).

Similarly, the Russian spelling of words was radically changed after Russian revolution in 1917. For example, one Russian character that occurs often at the end of words was eliminated from the vocabulary.

Another difficulty of indexing Chinese textual data, for example, is due to the fact that there are several methods that are being developed for inputting Chinese characters through a keyboard. A first method uses Pinylin, a system for writing characters phonetically with the Roman alphabet. A second method recognizes Chinese characters, so long as the strokes of each character are written in certain order. Currently, the Chinese IBM WorkPad™ supports simplified Chinese, which has fewer characters than traditional Chinese—7000 versus 10,000—and fewer strokes in some characters. Finally, a hybrid method allows the first character to be entered phonetically and the following one by strokes.

For all of the reasons described above, it is difficult to apply automatic handwriting or OCR recognition of textual data for indexing purposes that use word-based recognition of handwriting (or typed) input utterance. Accordingly, a need exists in the art for a system and method for indexing and searching textual archive which is independent of fonts and styles and which is operable with unknown words. Such a system would be particularly useful with Asian and Slavic languages, wherein word-based indexing and searching techniques are inefficient for managing textual archives.

SUMMARY OF THE INVENTION

The present invention is directed to a system and method for indexing and searching textual archives using semantic units such as syllables and morphemes. In one aspect of the present invention, a system for indexing a textual archive is provided wherein an AHR (automatic handwriting recognition) system and/or OCR (optical character recognition) system recognizes (decodes) textual input data (handwritten or typed text) into a string of semantic units (e.g., syllables or morphemes) using a statistical language model and vocabulary based on semantic units (such as syllables or morphemes). The string of semantic units that result from a decoding process are stored in a semantic unit database and indexed with pointers to the corresponding textual data in the textual archive.

In another aspect of the present invention, a system for searching a textual archive is provided, wherein a word (or words) to be searched is rendered into a string of semantic units (e.g., syllables or morphemes) depending on the application. A search engine then compares the string of semantic units (resulting from the input query) against the decoded semantic unit database, and then identifies textual data stored in the textual archive using the indexes that was generated during a semantic unit-based indexing process.

These and other aspects, features and advantages of the present invention will be described and become apparent

DETAILED DESCRIPTION OF PREFERRED EMBODIMENTS

Figure 1:
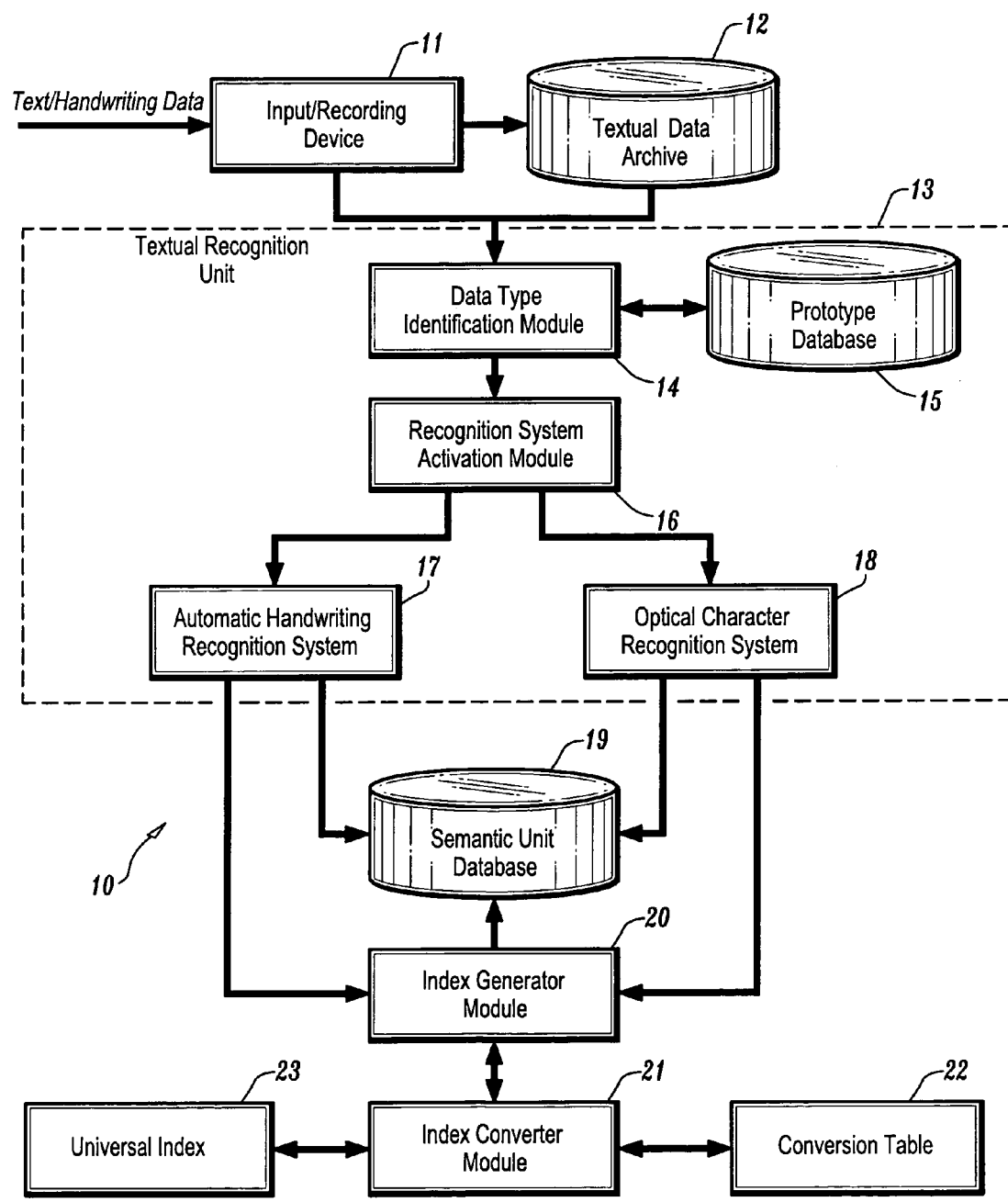
FIG. 1 is a diagram of a system/method for indexing a textual archive based on semantic units according to an embodiment of the present invention.

It is to be understood that the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM and Flash memory) and executable by any device, machine or platform comprising suitable architecture. It is to be further understood that because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

General Overview

The present invention is directed to a system and method for indexing and searching textual archives using semantic units such as syllables and morphemes. In general, with respect to indexing a textual archive, the present invention employs an AHR system and/or OCR system that recognizes (decodes) textual input data (e.g., recorded handwriting data or scanned text data which is stored in the textual archive) into a string of semantic units (e.g., syllables or morphemes) using a vocabulary and statistical language model based on syllables or morphemes, which is preferably constructed upon a large text corpus. The string of semantic units that result from a decoding process are stored in a semantic unit database and indexed to the textual data in the textual archive.

During a subsequent search process, a word (or words) to be searched is rendered into a string of semantic units (e.g., syllables or morphemes) depending on the application. A search engine then compares the string of semantic units (resulting from the input query) against the semantic unit database, and then identifies textual data stored in the archive using an indexing that was generated during the indexing process. Specific details of preferred embodiments of systems and methods for indexing and searching textual data are described below.

Advantageously, the use of semantic units allows language models to be constructed which represent semantic information and provides improved decoding accuracy for, e.g., an AHR system based on a vocabulary comprising semantic units. Indeed, as will be evident from the description herein, the use of semantic units for transcribing, indexing and searching textual data is particularly advantageous since such semantic units are clear and the amount of possible semantic units for a given language is finite.

Examples of semantic units which may be employed herein for purposes of transcribing, indexing and searching textual data include "syllables" in, e.g., the Chinese language and "morphemes" in, e.g., Slavic languages. For example, the unit morpheme exists in Asian languages such as Chinese, Japanese, Korean, Thai, and Vietnamese. In the Chinese language, each syllable is a morpheme (with very few exceptions where a morpheme consists of more than one syllable). In addition, each syllable is represented by a Chinese character known as a Hanzi. In modern standard Chinese language (the standard dialect Mandarin, or Putonghua, based on Beijing dialect), the total number of allowed syllables (or Hanzi) is 1400, whereas the number of standard written Chinese characters is 6700 in mainland China and 13,000 in Taiwan.

Furthermore, in the Korean language, there are less then 2400 acoustically allowed syllables. The writing system is based entirely on acoustic syllables (as described herein, the acoustic symbols are used to describe a complexity of the language system for handwriting/textual indexing since, as in a case with Chinese characters, phonetic written representation can be used to represent handwritten and typed words). In the Japanese language, there are only 105 allowed syllables In the Vietnamese language, there are 3000 different syllables and the writing system is based entirely on acoustic syllables. Similarly, languages that have very large number of word forms (e.g., Slavic languages which comprise several million word forms) have relatively small number of morphemes (e.g., the Russian language comprises 50,000 morphemes).

It is to be appreciated that the use of semantic units for indexing and searching textual archives associated with these languages is more efficient and computationally inexpensive than the word-based or word-bag based methods. Consequently, for any language in which conventional word-based techniques for transcribing, indexing and searching textual data is inefficient or inapplicable, the use of semantic units as the basic building block for indexing and searching is particularly advantageous. In addition, because of the finite number of syllables and morphemes, data compression as applied to the present invention is also more efficient. Furthermore, a semantic unit-based approach resolves the problem of unknown words, since all the semantic units are known.

Semantic Unit-Based Indexing

Referring now to FIG. 1, a diagram illustrates a system for indexing a textual archive based on semantic units according to an embodiment of the present invention. It is to be understood that FIG. 1 also represents a high level flow diagram of an indexing method according to one aspect of the present invention. The system 10 comprises a recording device 11 for recording/inputting text data or handwriting data. The recording device 11 may comprise any conventional recording/input device such as a scanner (for scanning typed or written text), electronic notepad (for recording handwritten text) or keyboard (for entering typed text), for example. The recorded text/handwriting data is stored in textual data storage 12 (or textual archive) and indexed using semantic units as described in detail below.

The system 10 further comprises a textual recognition unit 13 which, in a preferred embodiment, is adapted to first recognize the type of textual data (handwriting data, typed text) that is input from either the recording device 11 (real-time) or retrieved from the textual archive 12 (non-real time), and then select the appropriate recognition system. More specifically, the textual recognition unit 13 comprises a data type identification module 14 which identifies the type of input data by comparing the input data with information stored in a prototype database 15. The prototype database 15 comprises samples of typed and handwritten characters (e.g., strokes, phonetical fonts, time-dependent representations, etc.) of one or more languages. It is to be understood that, depending on the application (e.g., language), the data type identification module 14 can employ any suitable technique known to those skilled in the art for identifying the type of input data.

For instance, in one embodiment, the data type identification module 14 may identify data types by examining the geometric patterns of the input data and comparing the geometric patterns with known patterns that characterize particular data types. For example, typed textual data is characterized by features such as high level symmetry of lines, different characters have parallel strokes, sharp angles, and are relatively the same height, etc. On the other hand, handwritten characters are characterized by variations in size and direction of strokes, etc. In addition, the prototype database 15 preferably comprises different types of fonts for typed textual characters, wherein the identification module 14 can compare input textual data with the textual data in database 15 to find a matching font (using scaling and a suitable distance measure) to thereby define the data type and font of the input data.

Furthermore, the manner in which the data is input can be used by the identification module 14 to identify the data type. Indeed, it is to be understood that textual data (which is identified by the identification module 14) can be input and stored in any preferred form depending on the application. By way of example, there are various methods by which Chinese characters may be input via a keyboard, as well as systems that can recognize the type of input. For instance, one method utilizes what is known as Pinylin, which is a system for writing characters phonetically with the Roman alphabet. A second method recognizes Chinese characters based on the order in which the strokes of each character are written. Another method for inputting and recognizing Chinese character is hybrid method that allows a first character to be entered phonetically and the next character to be entered via strokes. Therefore, the data type identification module 14 may utilize knowledge of such input methods to identify the data type.

An activation module 16 activates an appropriate recognition system based on the type of data identified by the identification module 14. For instance, if the identification module 14 determines that given textual data is handwriting data, then the data is sent to an AHR (automatic handwriting recognition) system 17 for processing. On the other hand, if the identification module 14 determines that given textual data is typed text data, then the data is sent to an OCR (optical character recognition) system 18 for processing.

Furthermore, to address textual data that is represented in different fonts and styles which depend on the time intervals of when the data was produced, the system can be adapted to recognize fonts of a textual input and then decode the textual input using a recognition module that is adapted to decode the given font. Indeed, it is to be appreciated that the recognition systems 17 and 18 are adapted to transcribe/ recognize a textual input into a string of semantic units using one or more vocabularies and language models that are based on semantic units. In particular, depending on the given language of the recorded text/handwriting data, the OCR system 18 and AHR system 17 may each operate in one of several modes, e.g., a syllable-based recognition mode or a morpheme-based recognition mode. In a syllable-based recognition mode, the AHR system 17 or OCR system 18 utilizes a vocabulary comprising syllables and syllable language model to transcribe the input text/handwriting data into a strings) of syllables. Likewise, in a morpheme-based recognition mode, the AHR system 17 or OCR system 18 utilize a vocabulary comprising morphemes and a morpheme language model to transcribe the input text/handwriting data into a string(s) of morphemes. Preferred systems/ methods for generating a language model based on semantic units (e.g., morphemes or syllables), which may be implemented with the recognition systems 17, 18, will be described in detail below with reference to FIG. 2.

It is to be understood that the AHR system 17 and the OCR system 18 may comprise any suitable conventional device or technique known to those skilled in the art, which is adapted appropriately to transcribe/recognize textual input into semantic units. For instance, the AHR system 17 may employ the techniques described in U.S. Pat. No. 5,577,135 to Grajski et al, issued on Nov. 19, 1996 entitled "Handwriting Signal Processing Front-End For Handwriting Recognizers," which is incorporated herein by reference. In addition, the OCR system 18 may employ the techniques described in U.S. Pat. No. 5,805,747 to Bradford, issued on Sep. 8, 1998, entitled "Apparatus and Method For OCR Character and Confidence Determination Using Multiple OCR Devices," which is incorporated herein by reference. It is to be understood that although the preferred method for transcribing the textual data is performed automatically as described above, the step of transcribing may be performed manually using semantic-unit based stenography.

The semantic units that are output from the recognition systems 17, 18 are stored in semantic unit database 19 together with indexes (generated by an index generator module 20) that point to corresponding textual data that is stored in the textual data archive 12. In other words, depending on the application, decoded syllable and/or morpheme data, for example, is stored in database 19 together with indexes to the corresponding textual data in the textual data archive 12. The index generated by module for a given textual input is specific to a particular identified data type. Preferably, the indexing process utilizes time-stamping of the syllable and morphemes in the decoded strings so as to facilitate indexing, as is understood by those skilled in the art. This time stamping may be used to align the textual input with a corresponding audio data stream, wherein the textual input data (via semantic units) can be indexed to the corresponding audio frames using conventional techniques known to those skilled in the art.

It is to be appreciated that the index generated for a given data type may be converted (via an index converter module 21) to a universal index 23 using a conversion table 22 that comprises information of possible conversion of strokes, phoneme representations, characters, etc. The universal index 23 represents some general notations for different types of representation of textual data.

More specifically, the index generator module 20 will generate an index for each distinct data type (i.e., the same semantic units may have different indexes associated therewith which indicate the location where the same semantic units with a particular data type are stored). When a user enters a search query (comprising a given semantic unit) to perform a search using the indexes to locate words or word strings (in textual data archive 12) that are associated with the given semantic unit, the query may also indicate the data type, in which case the index corresponding to the data type is used to locate corresponding words. Alternatively, the querying user may desire to find all possible words that contain the given semantic unit for all the different data types. The universal index 23 advantageously provides a mechanism to provide this search option since the universal index 23 points to all semantic units for all the different data types. For a given semantic unit, the corresponding universal index 23 points to a plurality of indexes, each corresponding to the given semantic unit for a different data type. Each index (which is generated by index generator module 20 for a given data type), in turn, points to the same semantic unit for the associated data type. Advantageously, a universal index 23 for a given semantic unit allows a person to search for all textual data in all the different data types that contain the given semantic unit.

The process of generating a universal index 23 for a given semantic unit is performed by the index converter module 21 and conversion table 22. The converter module 21 utilizes the table 22 to translate an index for a given data type to a universal index 23. The conversion table 22 comprises a map that specifies which data type indexes correspond to the universal index for the given semantic unit. For example, assume that AAA represents a given semantic unit for a textual (typed) data type and that A'A'A' represents the same semantic unit for handwritten data type. Assume further that a1,a2,a3 are indexes to locations where typed textual data is stored that contains the semantic unit AAA, and that a1',a2', a3' are indexes to locations where handwritten data is stored that contains the semantic unit A'A'A'. The conversion table 22 may comprise an index aa1,aa2,aa3 and a rule by which indexes a1,a2,a3 and a1',a2',a3' can be obtained (e.g., aa1=100 and a rule that specifies to add 10000 to index aa1 to obtain an index to a handwriting type and to add 20000 to aa1 to obtain an index to textual type.) It is to be understood that the exemplary indexing system/method of FIG. 1 describes a scheme that involves object-indexing via semantic units (such as syllables, morphemes). It is to be appreciated that in other embodiments of the present invention, additional features can be implemented to index the textual data. For instance, the textual data can be indexed based on the author of the textual data. The labeling of textual-data with speaker names affords enhanced textual-search using speaker names such as described in the patent application U.S. Ser. No. 09/294,214, filed on Apr. 16, 1999, entitled "System and Method For Indexing and Querying Audio Archive," which is commonly assigned and incorporated herein by reference. Indeed, by way of example, the user can restrict a search of a given syllable query for an individual or a list of individuals.

Furthermore, using a suitable biometric system known to those skilled in the art, the stored textual data can further indexed based on based on handwriting biometrics and writing styles of persons associated with handwriting data. Moreover, the stored textual-data can be also indexed based on information such as the time and place where the textual data was produced, etc.

The textual-data can also be indexed based on pictorial-data that is placed on the same page of textual data. As explained below, the pictorial data allows a user to include with, e.g., a syllable query, other queries that implement an image recognition/searching technique known to those skilled in the art to find desired textual data that is associated with a certain picture or pictures.

Furthermore, the index generator module may implement the hierarchical index storage and searching techniques as described in U.S. patent application Ser. No. 09/108,544, filed on Jul. 1, 1998, entitled "Audio/Video Archive System and Method For Automatic Indexing and Searching", which is commonly assigned and incorporated herein by reference. With this hierarchical indexing technique, the syllables/morphemes are included in one of a plurality of layers in a hierarchical pyramid. During a search process, each subset of records that is selected/modified based on the index information of a given layer is successively refined for each layer that is searched thereafter so as to narrow the search results in a hierarchical manner.

Figure 2:
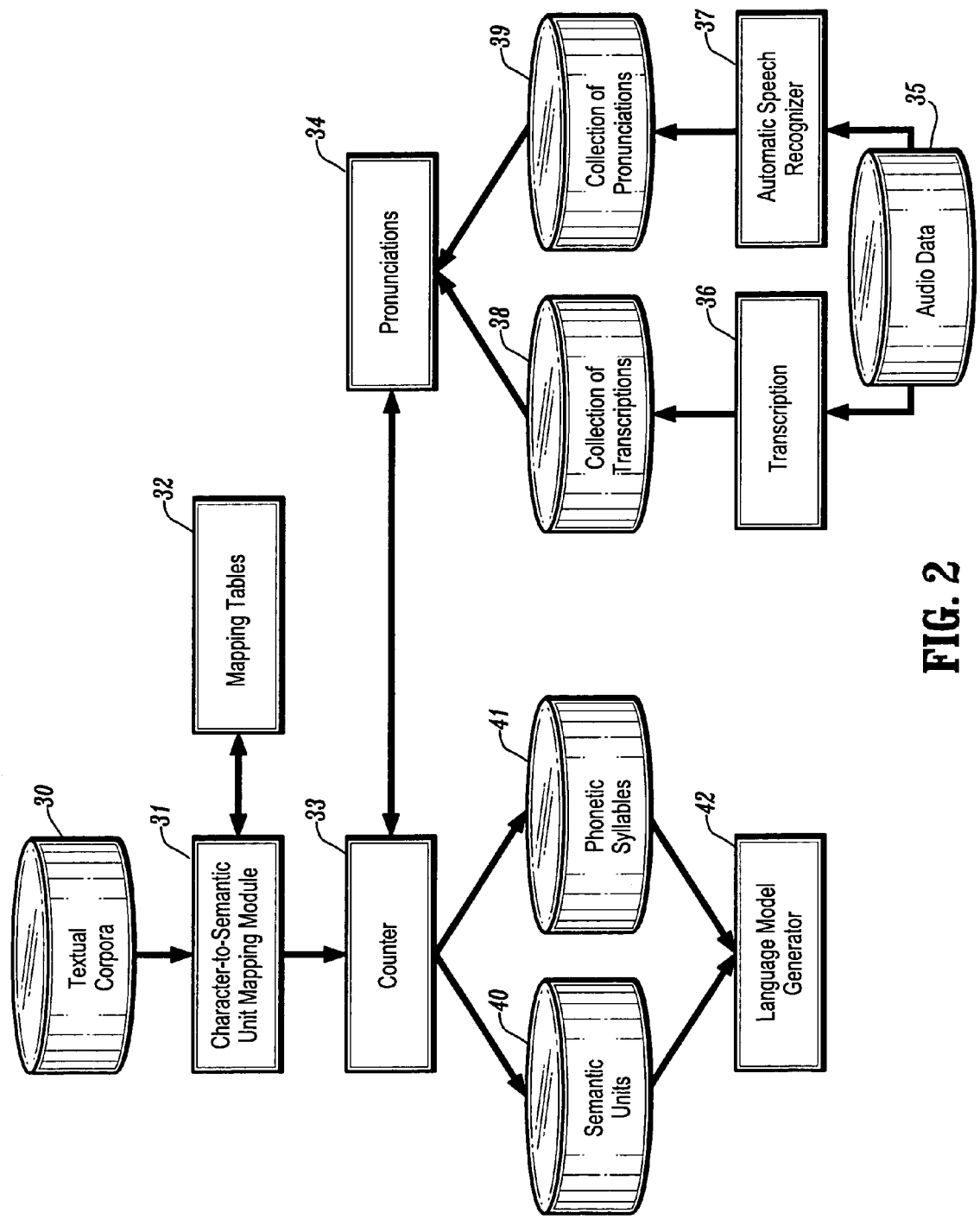
FIG. 2 is a diagram of a system/method for constructing a language model based on semantic units according to an embodiment of the present invention.

Referring now to FIG. 2, a block diagram illustrates a system/method for producing a language model based on semantic units. As explained above with reference to FIG. 1, one or more semantic unit-based language models are implemented with the recognition systems 17, 18 to decode textual data into strings of semantic units. A textual corpora in database 30 is transformed into a string of semantic units by a character-to-semantic unit mapper 31 (via mapping tables 32 that map strings of characters into, e.g., syllables). A counter 33 keeps track of the count for each of the different semantic units output from the character-to-semantic unit mapper 31.

To generate a language model of phonetic syllables, for example, it is important to know how syllables are pronounced (since a person will write phonetic syllables for a word based on how the person pronounces the word). Because the same syllable can have a different pronunciation, this data cannot be extracted directly from the textual corpus 30. Preferably, to obtain such information, pronunciation data stored in database 34 is utilized by the counter 33 to generate the appropriate count data. The pronunciation data 34 comprises data such as all possible pronunciations of words in the given language and/or how people transcribe them phonetically, which allows the counter 33 to differentiate between different pronunciations of the same written syllable.

More specifically, in the preferred embodiment illustrated in FIG. 2, the pronunciation data 34 is collected by transcribing audio data 35 and determining the different pronunciations for words. The audio data 35 may be transcribed manually 36 to generate a collection of transcriptions 38, or automatically using an automatic speech recognizer 37, which aligns phonetic syllables to a string of spoken syllables, to generate a collection of pronunciations 39. These collections are stored and indexed appropriately in the pronunciation database 34.

The counter 33 outputs the semantic units and corresponding counts 40 and phonetic syllable 41. The semantic units 40 represent a character string that bears some semantic meaning (e.g., syllables or morphemes such as roots in Russian words which are not actual words, but represent a common semantic meaning for different words that contain the root). The phonetic syllables 41 comprise a special string of character that represent how some strings of characters (corresponding to the given semantic units), e.g., syllables, sound. The phonetic syllables 41 and semantic units 40 (e.g., syllables/morphemes) are used by a language model generator 42 to derive probabilities of distribution of phonetic syllables given syllable 41 and generate a language model based on semantic units. In particular, using techniques known in the art, the syllable counts and conditional distributions of phonetic syllables 41 are used to construct LM of phonetic syllables. For example, this procedure is similar to constructing a language model for classes such as described in the articles by Eugene Charniak, entitled "Statistical Language Learning", The MIT Press, Cambridge, 1996; and Frederick Jelinek, "Statistical Methods for Speech Recognition", The MIT Press, Cambridge, 1998.) Methods for generating a language model for morphemes, for example, are described in U.S. Pat. No. 6,073,091, which issued on Jun. 6, 2000 to Kanevsky et al., entitled "Apparatus and Method For Forming A Filtered Inflected Language Model for Automatic Speech Recognition" and U.S. Pat. No. 5,835,888, which issued on Nov. 10, 1998 to Kanevsky, et al., entitled "Statistical Language Model For Inflected Languages," both of which are fully incorporated herein by reference.

Semantic Unit-Based Searching

Figure 3:
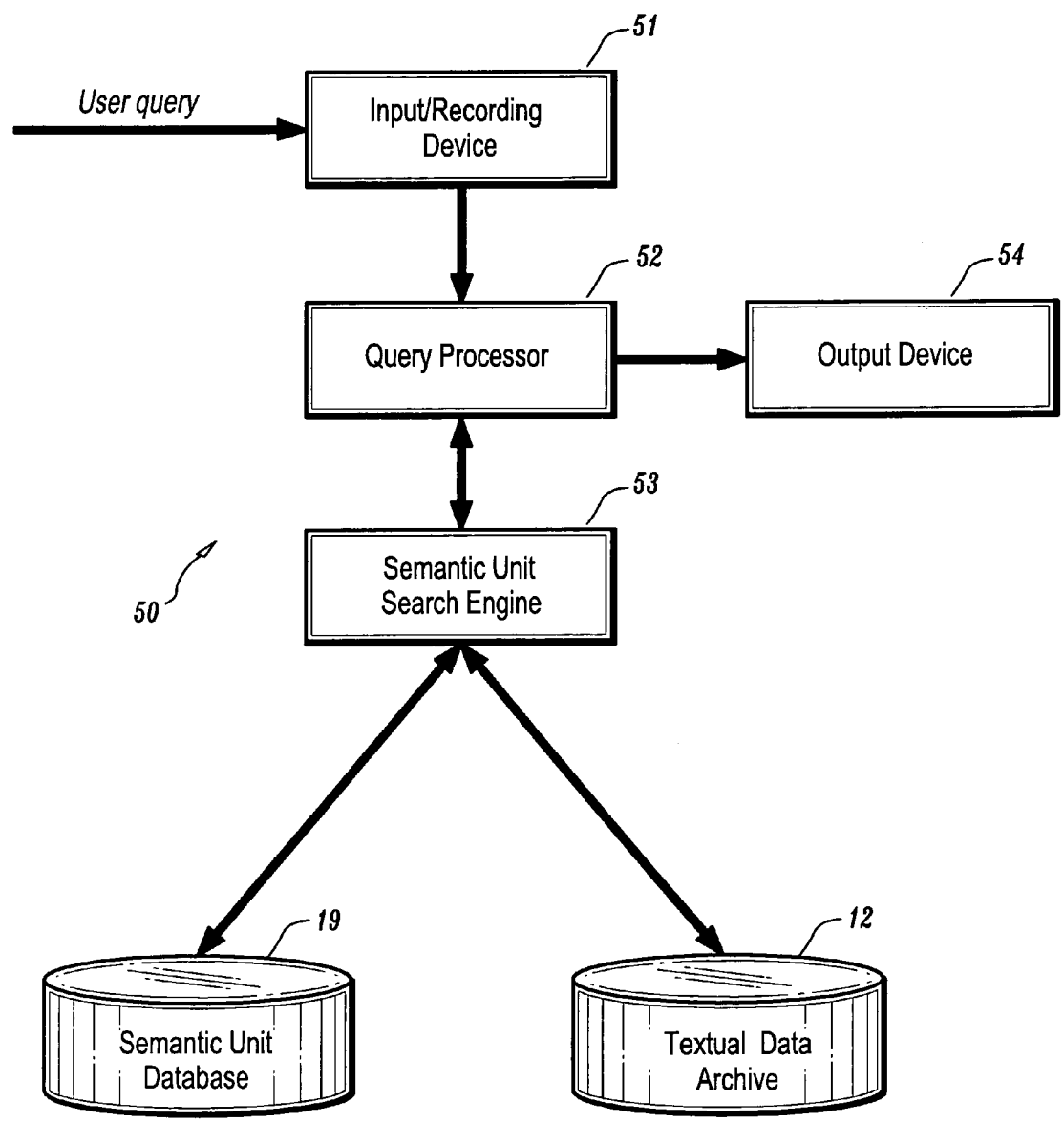
FIG. 3 is a diagram of a system/method for searching a textual archive that is indexed based on semantic units according to an embodiment of the present invention.

Referring now to FIG. 3, a diagram illustrates a system for searching a textual archive that is indexed based on semantic units according to an embodiment of the present invention. It is to be understood that FIG. 3 also represents a high level flow diagram of a searching method according to one aspect of the present invention. The system 50 comprises an input/recording device 51 for entering an input query (e.g., words and or semantic units). It is to be understood that the input device may be, for example, a keyboard for inputting a typed query, and OCR system for recognizing/transcribing a typed query, an ASR system for recognizing/transcribing a spoken query or an AHR system for recognizing/transcribing a handwritten query.

The input query is processed by a query processor 52 (the details of which are described below with reference to FIG. 4). The query processor 52 generates search attributes that are processed by a semantic unit search engine 53 (e.g., the search engine 53 may interpret the query as a sequence of syllables/morphemes). The user query may comprise additional information that is used to localize the search. Based on the query attributes, the semantic unit search engine 53 identifies and retrieves relevant textual data stored in database 12 via the indexing and semantic unit information stored in the semantic unit database 19.

The query processor 52 outputs the search results that are received from the search engine 53 via an output device 54. The output device may be, for example, a computer monitor for displaying the search results or any conventional text-to-speech synthesis system to convert the search results to audio segments for audio playback to the user.

Figure 4:
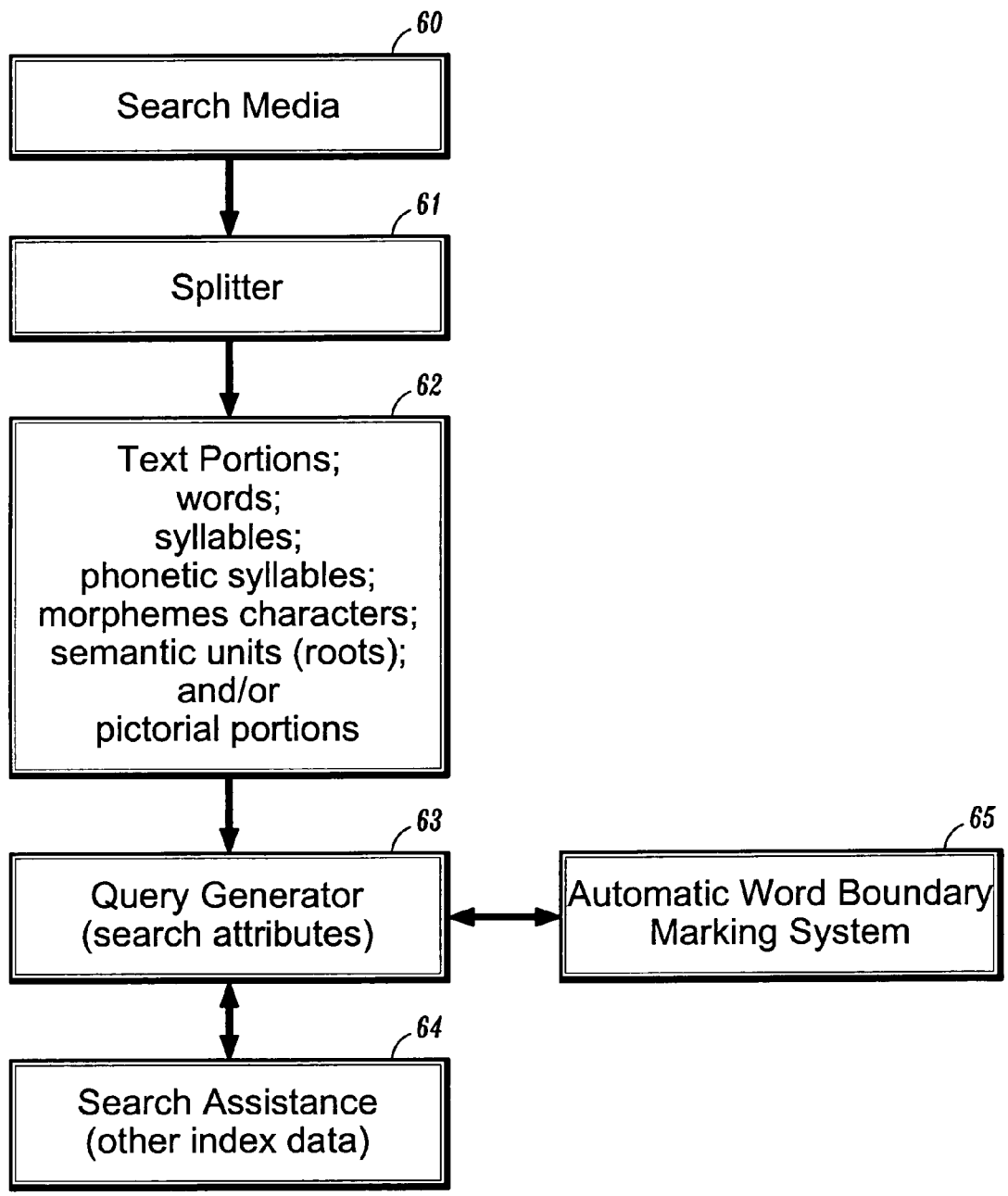
FIG. 4 is a diagram of a system/method for processing a query according to one aspect of the present invention.

Referring now to FIG. 4, a diagram illustrates a system/method for processing a query according to an embodiment of the present invention. More specifically, the diagram of FIG. 4 illustrates a preferred operation of the query processor 52 of FIG. 3. The type of search media 60 comprising a user query may comprise handwriting data, typed text and/or pictorial data. A splitter module 61 processes the search media 60 and splits the search media into textual units 62 (that were utilized during the indexing process (FIG. 1) to index the textual archive 12). For example, the textual units 62 output from the splitter module 61 may comprise text portions (e.g., phrases, paragraphs, chapters, poems, stories, etc.), words, syllables, phonetic syllables, morphemes, characters, or semantic units (e.g., roots in Slavic language). Furthermore, pictorial data can be split into pictorial portions using, for example, the techniques described in U.S. patent application Ser. No. 09/063,805, filed on Apr. 21, 1998, entitled "Random Visual Patterns Used To Obtain Secured Access," which is commonly assigned and incorporated herein by reference.

The user query may comprise words rather then a set of syllables. In this case, a word search is performed by converting the words into string of syllables using tables (as described herein). For example, with a Slavic language, a table may store words that are split in morphemes and endings. The user query may comprise a relatively long textual corpora rather than several words or syllables. The user can produce a written text (for example, if he/she manually types text into the computer). In these instances, a textual corpora or typed words are mapped into a string of syllables and a specific search mechanism can be used to find textual data in the archive 12 that matches a long string of syllables. For instance, the techniques disclosed in the above-incorporated U.S. Pat. No. 5,649,060 may be employed to match textual data with a reference textual corpora, even when a relatively low quality AHR is used. This technique exploits time stamping of a textual corpus and matches a small number of portions in the reference script with portions in the stored decoded output.

The textual units 62 are input to a query generator which generates search attributes based on the query. The query processor 63 may utilize a search assistance module 64 to provide other search attributes. For example, the search assistance module 64 may provide the hierarchical indexing information, e.g., syllables point to syllables, syllables point to words and words can point to phrases, using techniques as described in the above-incorporated U.S. patent application Ser. No. 09/108,544. In addition, the search assistance module 64 may comprises one or more systems such as a labeler that provides labels which are used to restrict a search (e.g., location, writer names, time period etc.), a time-stamping systems that uses time-stamping to index audio data and align it to textual data, and/or language model that is trained from a string of semantic units (e.g. syllables) and increases the accuracy of mapping audio data into string of units (e.g. syllables). Indeed, as explained above, the textual data in archive 12 may be indexed via a syllable index and other additional information about writers who produced the handwriting data. The labeling of handwriting data with writer identification enhances the textual search using personal names. The stored textual data can be also associated with handwriting biometrics that provide additional information about speakers (for example, a conventional method known in the art is used to relate handwriting manner to a social user status, age, sex, etc.). Stored textual data can be also marked with labels providing information such as the time and/or location when/where the textual data was produced, etc.

Furthermore, the search assistance module 64 may be used to select the appropriate index for searching the archive. Indeed, as explained above, some of textual data (with indexes) can be stored in some preferred input method (for example, Pinylin method). If a user enters a query input using a different method (e.g., a hybrid method allows the first character to be entered phonetically and the following one by strokes), the search assistance module 64 can recognize the method with which the user input key words. Subsequently, during the search process when the textual archive 12 is searched, the search assistance module 64 will verify the input method by which the original textual data was recorded (using, for example, the techniques described herein in connection with the data type identification module 14 (FIG. 1)). If the search assistance module 64 determines that the data is represented with a different input method, user input query is transformed into a query that corresponds with the index to such textual data. Similarly, if the system determines that the data being searched was recorded at times when different spelling was used, then the user input record will be transformed to match the appropriate index. It is to be appreciated that to convert the query to the appropriate format, the index converter module 21 discussed above (FIG. 1) is preferably utilized to convert the index from the given data type to a universal index 23, which, as described above, allows a search to be performed for all data type indexes. In addition, the conversion table 22 (FIG. 1) to convert indexed from one data type format to another.

The search system further comprises an automatic word boundary marking system 65 that is utilized by the query generator 63 to determine which portion of the character segment that contains a given semantic unit, for example, should be displayed to the user. For example, the user will receive all "words" that contain a given semantic unit in some query. The words are defined automatically by module 65. The implementation of the word boundary marking system 65 is particularly useful for, e.g., written Chinese which has no word boundaries. It is to be appreciated that any suitable technique known by those skilled in the art may be employed in module 65. For instance, techniques for defining word boundaries that are based on statistical characteristics are described in the article by C. J. Chen, et al. "Continuous Speaker-Independent Putonhua Dictation System," pp. 821–823, ICSP'96, 1996 3rd International Conference on Signal Processing Proceedings, which is incorporated herein by reference.

It is to be understood that the search results of a given user query may be represented to the user in one of various manners. For example, in one embodiment, the user can first view the decoded (syllable) output (in some printed or displayed format) and, after viewing the entire decoded output, the user can select a desired portion of the data to be represented to the user as it is stored in the database (e.g., by clicking the mouse on the desired portion of the textual output). In yet another embodiment, the user can view pictorial data that is associated with textual data that is returned in accordance with the user query. In a further embodiment, the textual data can be displayed starting from the syllable that was indicated by the user query forward/back until either the user stops the displaying, or the user inputs the desired length (in the query) of the textual segment to be displayed. The initial displaying of the textual output in a decoded format makes sense since it may require less storage being represented in an efficient standard form such as ASCII). On the other hand, the process of displaying original written data may be slower since it requires displaying a data as it was scanned from manuscripts into computers. Furthermore, if there are pictures in a manuscript, the amount of stored image and handwritten data can be large in comparison with the decoded formatted output.

In summary, the use of semantic units for purposes of indexing and searching textual archives advantageously remedies the disadvantages associated with word-based textual database management. For example, the use of semantic units for managing textual databases provides font independence from languages whose fonts change with time. Moreover, the use of semantic units enhances recognition accuracy for, e.g., AHR and OCR systems that employ vocabularies and language models based on semantic units, especially for languages that comprise a significant amount of different word forms but have a finite amount of semantic units associated therewith.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for managing a textual database, comprising the steps of:
   receiving textual data;
   identifying a data type of the textual data;
   transcribing the textual data into corresponding semantic units of words using a recognition system for the identified data type, wherein the recognition system performs transcription by decoding the textual data using a language model and phonetic dictionary of semantic units;
   storing the textual data in a textual database; and
   generating an index based on semantic units of words for indexing the stored textual data with the corresponding semantic units.

2. The method of claim 1, wherein the semantic units comprise syllables.

3. The method of claim 1, wherein the semantic units comprise morphemes.

4. The method of claim 1, wherein the textual data is associated with audio data, and wherein the step of indexing further comprises indexing the audio data with the semantic units.

5. The method of claim 1, wherein the step of transcribing comprises the step of time-stamping the semantic units.

6. The method of claim 1, wherein the step of generating an index comprises generating a hierarchical index wherein a semantic unit index points to one or more data modes.

7. The method of claim 6, wherein the one or more modes of data comprises words and pictures.

8. The method of claim 1, further comprising the step of converting the index into a universal index which cross-references characters of different fonts.

9. The method of claim 1, further comprising the step of searching the textual database for target textual data using the semantic unit index.

10. The method of claim 9, further comprising the step of converting a target word into a string of semantic units to perform the searching step.

11. The method of claim 10, wherein the step of converting a target word is performed automatically using a character-to-semantic unit mapping table.

12. The method of claim 9, further comprising the step of displaying search results, wherein the target textual data is displayed starting from a corresponding semantic unit in a user query and commencing one of forward and backward for a given length based on a user request.

13. The method of claim 1, wherein identifying a data type of the textual data comprises identifying data types including handwritten text and typed text.

14. The method of claim 13, wherein the different data types include handwritten text or typed text of different font or styles of a given language.

15. The method of claim 13, wherein transcribing textual data comprises decoding handwritten text using an AHR (automatic handwriting recognition) system and decoding typed text using an OCR (optical character recognition) system.

16. The method of claim 13, wherein generating an index based on semantic units of words comprises indexing the semantic units to stored handwritten textual data based on handwriting biometric data.

17. The method of claim 1, wherein generating an index based on semantic units of words comprises generating separate indexes for indexing the semantic units to stored textual data of different data types.

18. The method of claim 17, further comprising generating a universal index for indexing the semantic units to stored textual data of a plurality of different data types.

19. A program storage device readable by a machine, tangibly embodying a program of instructions executable by the machine to perform method steps for managing a textual database, the method comprising the steps of:

receiving textual data;

identifying a data type of the textual data;

transcribing the textual data into corresponding semantic units of words using a recognition system for the identified data type, wherein the recognition system performs transcription by decoding the textual data using a language model and phonetic dictionary of semantic units;

storing the textual data in a textual database; and generating an index based on semantic units of words for indexing the stored textual data with the corresponding semantic units.

20. A system for managing a textual database, comprising:

a data type identification system for identifying a data type of textual data;

a recognition system for transcribing the textual data into corresponding semantic units of words based on the identified data type, wherein the text recognition system performs transcription by decoding the textual data using a language model and phonetic dictionary of semantic units, wherein the recognition system comprises an OCR (optical character recognition) system for transcribing typed text, and an AHR (automatic handwriting recognition) system for transcribing handwritten text;

a textual database for storing the textual data; and an index generator adapted to generate an index based on semantic units of words, wherein the textual data stored in the textual database is indexed with the corresponding semantic units.

21. The system of claim 20, further comprising an index converter adapted to convert the index into a universal index which cross-references characters of different fonts for a given language.

22. The system of claim 20, further comprising:

a query processor adapted to transform a search query for target textual data into corresponding semantic units; and a search engine for searching the textual database based on the semantic units corresponding to the search query.

23. The system of claim 22, further comprising an automatic word boundary marking system that is applied to a search query.

* * * * *